United States Patent [19]
Cook et al.

[11] 3,850,748

[45] Nov. 26, 1974

[54] METHOD OF PRODUCING ANIMAL CELLS IN SUSPENSION CULTURE

[75] Inventors: Roland A. Cook, Indianapolis; Frederick T. Counter, Greenfield, both of Ind.

[73] Assignee: Eli Lilly and Company, Indianapolis, Ind.

[22] Filed: June 28, 1973

[21] Appl. No.: 374,729

[52] U.S. Cl. .............................................. 195/1.8
[51] Int. Cl. .............................................. C12k 9/00
[58] Field of Search ................................. 195/1.8

[56] References Cited
UNITED STATES PATENTS

| | | | |
|---|---|---|---|
| 3,073,746 | 1/1963 | Thompson et al. | 195/1.8 |
| 3,122,476 | 2/1964 | Gaeta | 195/1.8 |

OTHER PUBLICATIONS

Willmer–Cells & Tissue Culture, Vol. 1, (1965), pages 99 & 100.

Primary Examiner—Sam Rosen
Attorney, Agent, or Firm—Joseph A. Jones; Everet F. Smith

[57] ABSTRACT

A new and superior method of producing cells in suspension culture is carried out by culturing the cells in a new culture medium under suitable agitation in a culture vessel which presents resinous, organic, polymeric surfaces to the medium. Blood serum is an ingredient of the medium. The temperature and pH of the medium are those regularly used in cell culture. The cells remain in the culture without passaging, cells being removed as necessary to keep the cell population at about $10^5$ to about $10^6$ cells/ml. Medium is periodically removed and replaced with fresh medium, and aggregated cells are periodically dispersed.

12 Claims, No Drawings

METHOD OF PRODUCING ANIMAL CELLS IN SUSPENSION CULTURE

BACKGROUND OF THE INVENTION

The in vitro growth of animal cells as cell cultures is now an old art. Many researchers have explored the various methods of propagating animal cells. Cultures of animal cells are usually grown in the form of a cell sheet attached to a surface and immersed in culture medium. A standard flat-sided cell culture bottle is available for such cultures.

The cell sheet method has the advantage that practically the entire volume of the culture bottle is filled only with air, which serves as a gas supply and waste reservoir. Freom every other standpoint, however, the bottle culture method is awkward and costly. An enormous amount of incubator space is used for a relatively small quantity of cells grown; it is necessary to disperse the cell sheet in order to passage cells to a new culture; it is necessary to clean and sterilize many bottles in order to grow a relatively small number of cells; the probability of contaminating the cultures in handling the individual bottles is high; it is impossible to count the cells without dispersing the cell sheet.

Cell culture researchers have endeavored to develop satisfactory methods of propagating cells in suspension in order to increase the number of cells which can be grown in a given amount of space, and also to provide a convenient method of counting the cells and thus monitoring the progress of the culture. Perhaps because most animal cells live, not in suspension, but in a solid mass, many difficulties have delayed the development of suspension culture processes. Suspension culture has been most successul with cells of tumorigenic origin and with cells which naturallly live in suspension in the animal organ of origin. For some unknown reason, mouse cells are in general more readily adaptable to suspension culture than are cells derived from other animals.

Usually, only cells of continuous cell lines are propagated in suspension culture. It is quite possible, however, to maintain primary animal cells, or low passage cells, in suspension culture.

The literature of suspension culture is extensive. The following references are by no means exhaustive but are representative of the literature.

Cherry and Hull, Studies and Observations on the Growth of Mammalian Cells in Agitated Fluid Medium, *J. Biochem. and Microbio. Tech. and Eng.* II, 265–285 (1960), reported their work with suspension cultures of a large number of animal cells, grown in several types of glass vessels. A number of cells were grown successfully in suspension cultures.

Ulrich and Moore, A Vibrating Mixer for Agitation of Suspension Cultures of Mammalian Cells, *Biotech. and Bioeng.* VII, 507–515 (1965), discussed the effectiveness of a vibrating-disc mixer for keeping cultured cells in suspension. They used four cells in their reported work, all of them of malignant origin.

Pirt and Thackeray, Environmental Influences on Growth of L and ERK Mammalian Cells in Shake-Flask Cultures, *Exp. Cell Res.* 33, 406–412 (1964), discussed the effect of altering the culture medium on cultures of cells kept in suspension by shaking the culture flasks.

Sinclair et al., Culture of Strain L Cells in Suspension: Replacement of Polymer by Traces of Trypsin in a Defined Medium, *Nature* 197, 982–984 (1963), discussed the effects of adding viscosity-raising polymers or trypsin to suspension cultures in shaken flasks.

Chapman and Ramshaw, Growth of the IB-RS-2 Pig Kidney Cell Line in Suspension Culture and Its Susceptibility to Foot-And-Mouth Disease Virus, *Applied Microbiol.* 22, 105 (1971), reported the adaptation of the IB-RS-2 cell to suspension culture in glass culture vessels. The adaptation process was not complete until the cells had spent six months in suspension culture. The fully adapted pig kidney cells were capable of about three-fold multiplication in about three days.

Cooper et al., The Bulk Growth of Animal Cells in Continuous Suspension Culture, *J. Gen. Microbiol.* 21, 702–720 (1959), discussed both batch and continuous methods of handling suspension cultures of animal cells. They grew continuous cultures both by periodic withdrawals and additions of medium, and by constant flow of spent and fresh medium out of and into the cultures.

Ziegler et al., The Propagation of Mammalian Cells in a 20-Liter Stainless Steel Fermentor, *Appl. Microbiol.* 6, 305–310 (1958), reported their success in propagating three different cells in a stainless steel stirred culture vessel. Fresh medium was added to the vessel to keep the culture in a multiplying phase. The cells used as seed had been previously adapted to suspension growth.

Danes, Suspension Cultures of Strain L Mouse Fibroblasts, *Exp. Cell Res.* 12, 169–179 (1957), pointed out that the accumulation of cells at the fluid-air interface of a suspension culture was a major problem with such cultures. He avoided or minimized the problem by silicone-treating his glass culture vessel and by avoiding variations in stirring speed.

Walker et al., Adaptation of Disposable Plastics to Quantitative Mammalian Cell Culture, *Texas Rep. on Biol. and Med.* 20, 686–692 (1962) reported the use of polystyrene tubes to eliminate cell adhesion in radiation experiments.

It is known that animal cells can live with various degrees of success in suspension cultures. Metal, glass, and treated glass vessels have been used successfully. It is known that cells, even those adapted to surface culture, are likely to be difficult to adapt to suspension culture. Unadapted cells, when placed in suspension culture, usually adhere to the stirrer and to the walls of the vessel, particularly at the medium-air interface, and also tend to form suspended clumps. Aggregated cells tend to become vacuolated. In the early stages of adaptation, the cells multiply slowly if at all. Many cells die, particularly those which are aggregated. If the cells adapt successfully to suspension culture, less clumping and adherence to the walls occur, and the multiplication rate of the cells increases.

It is clear that suspension culture offers a significant advantage in the efficient and economical culture of a large number of cells, which can be used, for example, as hosts for the production of virus vaccines. Improvements in the suspension culture process are needed and are potentially of great economic importance.

SUMMARY

A new method of producing animal cells in suspension culture comprises culturing the cells in a new medium in a culture vessel which presents resinous, organic, polymeric surfaces to the medium. The culture is agitated and the pH and temperature are maintained at appropriate levels. Medium is withdrawn and fresh medium is added to replace nutrients used by the cells. Aggregates of cells are periodically dispersed as necessary. Cells are withdrawn as multiplication occurs to hold the cell population at about $10^5$ to about $10^6$ cells per milliliter.

DESCRIPTION OF THE PREFERRED EMBODIMENT

Our new method of producing animal cells in suspension culture comprises:

A. adding a population of at least about $10^5$ of the cells per ml. to a suspension culture medium comprising:

| Ingredient | Preferred Concentration (mg./l.) | Concentration Range (mg./l.) |
|---|---|---|
| NaCl | 2680 | 2410–2950 |
| KCl | 155 | 140–170 |
| NaH$_2$PO$_4$.H$_2$O | 550 | 500–600 |
| MgSO$_4$.7H$_2$O | 78 | 70–85 |
| NaHCO$_3$ | 410 | 360–450 |
| glucose | 3500 | 3150–3850 |
| l-arginine | 168 | 151–185 |
| l-cystine | 38 | 34–42 |
| l-histidine | 49 | 44–54 |
| l-valine | 73 | 66–80 |
| l-isoleucine | 84 | 76–92 |
| l-leucine | 84 | 76–92 |
| l-lysine | 92 | 83–101 |
| l-methionine | 24 | 21.5–26.5 |
| l-phenylalanine | 51 | 46–56 |
| l-threonine | 76 | 68–84 |
| l-tryptophan | 16 | 14.5–17.5 |
| l-tyrosine | 57 | 51–63 |
| l-glutamine | 584 | 525–640 |
| l-alanine | 14 | 12.5–15.5 |
| l-asparagine.H$_2$O | 24 | 21.5–26.5 |
| l-aspartic acid | 21 | 19–23 |
| l-glutamic acid | 23 | 20.5–25.5 |
| l-proline | 18 | 16–20 |
| l-serine | 16.5 | 15–18 |
| glycine | 12 | 11–13 |
| choline chloride | 1.6 | 1.4–1.8 |
| folic acid | 1.6 | 1.4–1.8 |
| i-inositol | 3.2 | 2.9–3.5 |
| nicotinamide | 1.6 | 1.4–1.8 |
| d-calcium pantothenate | 1.6 | 1.4–1.8 |
| pyridoxal hydrochloride | 1.6 | 1.4–1.8 |
| riboflavin | 0.16 | 0.14–0.18 |
| thiamine hydrochloride | 1.6 | 1.4–1.8 |
| methyl cellulose, 15 cps | 120 | 110–130 |
| tryptose phosphate broth powder | 1290 | 1150–1400 |
| blood serum | 80 ml./l. | 10–200 ml./l. |
| distilled pyrogen-free water q.s. to 1000 ml. | | |

B. said medium being contained in a culture vessel substantially all the medium-contacting surfaces of which are resinous, organic, polymeric surfaces;

C. culturing the cells, said culturing comprising the steps of:
1. agitating the medium sufficiently to keep the cells in suspension, but not so vigorously as to cause foaming of the medium or denaturation of components of the medium;
2. maintaining the temperature of the medium at about 32°C. to about 41°C.;
3. maintaining the pH of the medium at about 6.8 to about 7.2;
4. periodically removing part of the medium;
5. periodically replacing the medium removed with fresh medium;
6. periodically dispersing aggregates of cells; and
7. periodically removing a quantity of cells sufficient to maintain the cell population at about $10^5$ to about $10^6$ cells per milliliter.

Our method provides an improvement in the suspension culture art which allows the efficient production of animal cells in suspension culture. A further, particularly surprising advantage of our method is its ability to adapt cells to suspension culture by merely culturing the cells under the same conditions disclosed above for producing cells. It will be understood that there is no distinct line between adaption of a cell and production of the adapted cell. The adaption stage is evolutionary; the cell gradually adapts and manifests its adaptation by multiplying more and more rapidly. The production process according to our method may be begun by planting the medium with unadapted cells, which are adapted to suspension culture by the culture method described above.

As will be explained below, cells are regularly removed from the suspension culture beginning as early in the adaptation process as the cells begin to multiply and to raise the culture population out of the proper range. Cells which are removed from the culture in order to maintain the population level are perfectly usable as biological production hosts or for other purposes. Therefore, the production of cells from a suspension culture operated according to our method begins as soon as the cells begin to multiply, and proceeds coextensively with the adaptation of the cells.

Animal cells, such as are produced in our method, are most commonly used as hosts in the production of biological products in cell culture. Vaccines, antitoxins, and similar antigens are regularly produced in cell culture. It is possible to use cells produced in our method as hosts in the same suspension culture used for the production of the animal cells. In such a suspension culture, multiplication and production of the animal cells proceeds at the same time and in the same vessel as the production of the biological product which is growing in the cells. It is also possible and convenient to keep a suspension culture according to our invention exclusively for the production of cells, which are removed from the culture and transferred to another culture in which the cells are used as hosts.

It will be understood that the quantity of cells produced by a given suspension culture depends entirely on the size of the culture. For example, if the culture contains a population of 500,000 cells per ml. and multiplies at the rate of a 50 percent increase per day, each milliliter of the culture will produce 250,000 cells per day. It is simple to calculate the size of the culture needed to produce any given quantity of cells which may be needed.

Our method is broadly applicable to the production of animal cells. Cells of kidney origin are most widely used in cell culture, and our method is very successful in producing kidney cells in suspension culture. The method is also applicable to cells of other organs, including liver, brain, epithelial, lung, heart, and fibroblast cells, of embryo, newborn, and adult animal origin. Our method is not limited to cells derived from any certain type of animal, but is effective in producing cells of animals broadly. For example, cells of swine, bovines, sheep, chickens, rabbits, hamsters, primates, ferrets, dogs, cats, turkeys, humans, horses, and goats can be produced by the proper use of our method.

Our new culture medium, described above, is an important factor in the success of our method. A great number of culture media have been described in the prior art. Culture media for cells always comprise mixtures of amino acids, vitamins, and inorganic salts. Frequently, blood sera and polymeric substances are used in culture media. Our medium has some similarities to the prior art media, but it has been found in practice that our medium produces outstanding results in suspension culture. Several aspects of our medium will be discussed in detail.

The concentrations of the ingredients in the medium are described above as ranges which cover approximately plus or minus 10 percent from the midpoint of the concentration range. Media prepared by combining our medium ingredients in concentrations anywhere within the ranges shown will be found effective and superior in our method. Our preferred medium, with which we have found the best success, is prepared by using each ingredient at approximately its preferred concentration.

The most unique aspect of our culture medium is its low osmolality. The salt content of the medium is very low as compared with typical cell culture media, and the glucose content is quite high. For example, typical cell culture media contain NaCl concentrations in the range of 8000 mg./l., about 400 mg./l. of KCl, and only about 1000 mg./l. of glucose. The osmolalities of such culture media are usually in the range of 280–320 milliosmoles. In contrast, the osmolality of our culture medium is only about 235 milliosmoles. We have no theory to explain the uniquely desirable effect of our culture medium in the adaptation and production of animal cells in suspension culture. It seems probable, however, that the low salt content, high glucose content, and the resulting low osmolality of our medium are important, since those characteristics are the outstanding ones in which our medium differs from the prior art media.

It is frequently convenient to incorporate pH indicators so that an undesirable change in the pH of the medium will be signaled by a color change. For example, phenol red is frequently used in cell culture media, and may be incorporated if desired without biological effect.

The amino acids used in our medium are in general those which have been known in the past to be required for health of cultured animal cells. Small changes in the composition and concentration of the amino acid portion of the medium can be made without a major deleterious effect, as is well known to those skilled in cell culture. It is even possible to substitute lactalbumin hydrolysate for all of the amino acids.

Similarly, the vitamins which are used in our medium are the vitamins commonly known to be necessary to animal life in general. It is possible, if desired for some reason, to omit the individual vitamins from the medium and supply them by adding yeast extract.

Methyl cellulose, 15 cps, is added to our medium to increase its viscosity very slightly and to provide a polymer cushion between individual cells and between the cells and the vessel wall and stirrer. Our medium containing methyl cellulose is much preferable to the same medium without methyl cellulose. As is well known, however, other viscosity-increasing polymers can be substituted for methyl cellulose. For example, carboxymethyl cellulose, polyvinylpyrrolidone, agar and alginates in a medium provide approximately the same benefits as does methyl cellulose.

Tryptose phosphate broth powder is a well-known nutrient concentrate, which is composed of sodium chloride, disodium phosphate, dextrose, and a peptone.

Many kinds of blood sera are effective in particular instances. Bovine sera are preferred, and fetal calf serum and newborn calf serum have been found to be particularly effective. Horse, chicken, dog, sheep, human, swine, and cat sera are also useful as ingredients of our medium. A preferred range of concentration of the blood serum in our medium is 50–150 ml./l. Lesser amounts of serum, down to 10 ml./l., are effective although the growth of the cells may be slow in particular cases. Greater amounts of serum up to 200 ml./l. are effective although costly. Those skilled in the art are aware of the way in which the amount of serum used is adjusted to reach the optimum balance between the cost of the medium and rapid multiplication of the cells.

It is possible to substitute certain components of blood serum in place of whole blood serum. For example, various proteins, and especially albumin, isolated from blood sera have been used in cell culture media to provide approximately the same benefits provided by the whole sera. The serum component of a culture medium is a source of nutrients for the cells. The addition of one or more components of a serum which provide the desired nutrient constituents is equivalent to adding a whole serum.

Our new suspension culture medium is prepared by simple dissolving of the various ingredients in sufficient distilled, pyrogen-free water to make the mixture up to the desired volume. The complete medium is usually sterilized by membrane-filtration.

The second important factor in our method of cell production is the use of a culture vessel which presents resinous, organic, polymeric surfaces to the culture medium, and hence to the cells. Substantially all the medium-contacting surfaces of the vessel are polymeric. Cells do not adhere, or adhere only to a slight extent, to the polymeric surfaces. The vessel may either be constructed of an appropriate polymer, or may have its interior surfaces coated with an appropriate polymer. Naturally, the interior, medium-contacting fittings of the culture vessel, particularly the agitator, should also be fabricated from or coated with a suitable polymer.

A culture vessel which presents some small area of nonpolymeric surface to the culture medium can be used, so long as substantially all of the medium-contacting surfaces of the vessel are polymeric. Of course, minimizing the area of nonpolymeric surface exposed to the medium decreases the chance of harmful adherence and aggregation of cells on the surface. Nevertheless, a small amount, such as a few percent of the total area of surface exposed to the medium, may be of nonpolymeric material without serious harm to our method.

Our method of cell production is effective when any of a wide variety of polymers are used in the construction of the culture vessel. The choice of the polymer for use in a culture vessel is, as usual, a matter of balancing cost against the characteristics of the available polymers. In most instances, polypropylene and polycarbonate are the preferred polymers for the construction of solid-wall vessels. The strength, ease of fabrication, and ability to withstand repeated sterilization of polypropylene and polycarbonate are important properties encouraging the use of those polymers. Polytetrafluoroethylene is a preferred choice, despite its high cost, for coating vessel parts constructed of an inexpensive material.

We have found that a number of known resinous, organic polymers are also highly satisfactory for use as the medium-contacting surfaces of culture vessels to be used in our method. The useful polymers are those which are entirely or practically water-insoluble, are not significantly swelled by water, and are substantially inert to animal cells. For example, polypropylene, polycarbonate, polytetrafluoroethylene of both the FEP and TFE types, both linear and conventional polyethylene, polyvinyl chloride, polyvinylidene chloride, polystyrene, polymethylpentene, polyethylene terephthalate, styrene-acrylonitrile, methyl methacrylate, nylon, polymethacrylamide, polyethylmethacrylate, natural rubber, synthetic rubber, silicone rubber, phenol-aldehyde resins, and polyepoxide resins are satisfactory resinous, organic polymers.

It is usual to mix nonpolymeric materials with polymers, particularly those used for structural purposes. Reinforcing armatures such as wire, fabric, and glass fiber are used to strengthen polymeric structures, such as culture vessels. Mineral and organic fillers, such as finely-powdered chalk, clay, and the like are often mixed with a polymer in order to lower the average cost of the filled polymer. The addition of reinforcing armatures or fillers to the polymer from which culture vessels for use in our method are made is not harmful to the effectiveness of our method. It is necessary only to assure that the medium-contacting surfaces are composed wholly or primarily of a suitable resinous, organic polymer. For example, the culture vessel may be fabricated from a heavily-filled polymer, and the interior surface coated with a thin layer of pure or essentially pure polymer.

We have observed that repeated use of a polymeric vessel as a cell culture vessel tends to change the vessel in such a way as to injure its effectiveness in our method. We have no theory to explain our observations, but it is clear that after lengthy use of the vessel, cells begin to adhere to the vessel walls. As a result, multiplication of the cells in the culture begins to slow down, and the number of nonviable cells begins to increase. We have been able to return vessels which have adversely changed as described to their original condition by washing the interior of the vessel with a chelating agent such as a solution of a salt of ethylenediaminetetraacetic acid (EDTA), or of nitrilotriacetic acid.

The mechanical design of the culture vessels in which our method is carried out is not new. Suspension culture vessels have been described in the literature. Some discussion of the best design for such vessels will be given, however, in order to explain the relationship of our process to the vessel in which it is carried out.

A culture vessel to be used in our method must provide for the metabolic needs of the cells to be cultured, and must provide agitation adequate to keep the cells in suspension. The vessel must allow control of pH and temperature of the medium and exchange of gases into and out of the headspace of the vessel. Its design must also allow removal of cells and spent culture medium and addition of fresh culture medium, and must protect the culture from adventitious organisms.

Our production method may be carried out in either very small or very large vessels. The scale of the cell culture is immaterial to the success of our method. Obviously, however, it is convenient to start the adaptation process in small, easily handled equipment, and to scale up gradually as production proceeds.

It is essential that the culture vessel protect the cell culture from adventitious organisms. Therefore, the culture vessel must be capable of being kept completely impervious to organisms, even those as small as viruses. The microbiological engineering art is well aware of the problem of vessel sterility. The problem is solved first, by minimizing the number of openings in the vessel, and second, by installing seals which are capable of maintaining sterility on every opening. For example, sterile filters are installed on breathers through which the vessel has access to ambient air. Agitation power enters the vessel either by a magnetic link through a solid vessel wall, or by a shaft running through a sterile packing gland or mechanical seal. Pipes entering the vessel are provided with fittings which may be sterilized before hookup, and are impervious when hooked up.

No further instructions as to sterility control of our method will be given. Those skilled in the art are aware of the necessity to maintain sterility and know how to do it.

The culture vessel must provide sufficient agitation of the culture medium to keep the cells in suspension. Agitation must not be so vigorous that the medium begins to foam, or that the protein constituents of the medium are denatured. In general, denaturation of proteins is signaled by foam development. No injury to the cells is normally caused by agitation sufficiently gentle that the medium does not foam.

Mechanical design of the agitator must be such that no rubbing contact of parts occurs which could result in grinding cells. The agitator should be designed for high liquid flow and the lowest power input consistent with keeping the cells in suspension.

Because of the necessity to keep the culture sterile, agitators which may be driven through the vessel wall are preferred. Such drives require magnetic linkage, and therefore are essentially limited to relatively small vessels. A very simple satisfactory agitator for small cultures is a magnetic stirring bar hung from the top of the vessel by a wire and swivel and driven by a magnetic stirring motor. On a larger scale, a magnetically-linked drive mounted at the top end of the agitator shaft and driven through the top of the vessel wall by the powered section of the magnetic drive is a very effective agitator power transmission. Large cultures must be agitated with shaft-driven agitators, because the power demand is too great for magnetic drives.

In general, the most effective agitators for low-density suspensions such as suspension cultures are turbine or paddle-type agitators. Such agitators are preferably mounted by placing the agitator shaft vertically in the center of the tank and locating the agitator close to the bottom of the tank. Installing radial baffles in the vessel increases the eddy currents in the suspension and uses the agitation power more effectively.

Small suspension cultures are effectively agitated by agitating the entire culture vessel. The art is well aware of growth of suspension cultures on shaking tables and in rolling culture vessels. However, serious mechanical difficulties are imposed by either shaking or rolling a suspension culture. The attachment of the necessary gas and medium exchange lines to the culture vessel is greatly complicated by agitation of the entire vessel. Therefore, while it is entirely possible to conduct our process in a shaken or rolled vessel, such a vessel is not a preferred one.

The design of the culture vessel should provide for the convenient control of the pH and temperature of the culture medium. Since variations in the pH occur comparatively slowly, it is possible to control pH by measuring the pH of a sample periodically removed from the culture, and making additions of acids or bases as needed. It is much more convenient to install a permanent pH electrode in the culture vessel. If it is desired to minimize the operator time spent on the culture, a permanent pH electrode can be connected through appropriate instrumentation to automatic valves which admit an acid or a base as needed to control the pH in the desired range.

Small-scale culture vessels usually are temperature-controlled simply by storing the vessel and its auxiliaries in a temperature-controlled incubator or room. Larger culture vessels can be temperature-controlled by circulating water or other thermal control medium through an external jacket or through coils or hollow baffles immersed in the medium.

A culture vessel to be used in our method must provide for the convenient exchange of culture medium and gases in and out of the vessel. A very small-scale culture usually needs only one gas port, a simple breather opening into the headspace of the vessel. Larger cultures, which less readily reach equilibrium with the headspace gas, require lines through which air or modified air can be supplied to and exhausted from the headspace.

As is well known, the problem of pH control is intimately related to the problem of controlling the amount of carbon dioxide in the headspace gas, and hence dissolved in the culture medium. Therefore, it is possible and convenient to control the pH of a culture by using a permanent pH electrode immersed in the culture medium to send signals to automatic valves controlling the amount of carbon dioxide in a stream of modified air entering the headspace of the vessel.

Accessories in the culture vessel must allow for the removal of spent medium and its replacement with fresh medium, and for the occasional removal of the entire culture. It is possible to use a single line opening near the bottom of the vessel for all the liquid-handling necessary. It must be kept in mind, however, that the use of a single entrance line for all purposes requires the frequent hooking up and breaking of liquid connections, with accompanying danger of contamination of the culture at each manipulation.

Therefore, it is preferable to install a line into the culture vessel which is permanently connected to a source of sterile medium. Other lines opening into the part of the culture vessel occupied by the medium are used for the removal of medium or the complete culture.

For example, one convenient design for the culture vessel provides an opening at the bottom of the tank for the removal of all or part of the mixed culture. Another line opens near the top but under the surface of the culture medium, for the removal of clear medium from which the cells have been allowed to settle out. A third opening can be provided near the vertical midpoint of the culture medium for the removal of larger amounts of clear medium.

It is obviously desirable to be able to remove clear culture medium from the vessel without allowing the cells to settle out. Such removal of medium is possible if a proper filter is installed in the culture vessel. Suitable filter media may be chosen from among the porous sintered metals, porous glasses and ceramics, and porous polymeric compositions, having a porosity in the range of 0.2 micron. Such a filter must be so installed that it is not occluded by cells filtered from the medium passing through the filter, particularly if the filter is not polymeric. One good way to install such a filter is to place it at the bottom of the vessel directly beneath the agitator, which keeps the filter swept clear. Usually no filtering pressure differential other than gravity will be needed for such a filter.

Alternatively, spent medium can be removed from the culture through a cylindrical spinning filter which has the filtering surface on its outer periphery. A filtering pressure differential is supplied by pumping the filtered medium from the interior of the cylinder.

Operation of the culture vessel is easier if a means is provided for the convenient withdrawal of small samples of the culture. A simple sampling device for a small vessel is a rubber septum in the wall, through which a sample is withdrawn with a needle and syringe. A larger scale vessel can be equipped with a sampling valve. Such valves are designed to engage a sterilizable sample container, and are capable of withstanding the necessary frequent sterilization.

A suspension culture may be used to produce cells according to our method for any desired period of time. The culture must be kept under the proper conditions of agitation, pH, and temperature. Manipulations of the culture, described below, must be performed periodically as needed to keep the cell population in the proper range, the medium in a proper nutritive condition, and to prevent accumulation of aggregates of cells.

An adaptation to suspension culture of an animal cell, or the production of an adapted cell, according to our method is begun by inoculating a portion of our culture medium in a culture vessel as described above with a cell population within the range from about $10^5$ to about $10^6$ cells per ml. The exact preferred population for a given cell must be found experimentally. One skilled in the art can easily determine the optimum population by starting suspension cultures at various populations within the named range and observing which of the cultures multiplies most successfully. Reasonable variations in the population do not seriously slow the multiplication of the cells. It will be understood, however, that the best population for each cell must be determined individually, and that in some cases it may be necessary to operate a culture at a population outside the range named above.

The temperature of the culture medium should be kept in the range from about 32° to about 41°C. The preferred temperature range, in general, is from about 35° to about 38°C. when mammalian cells are to be cultured. The temperatures named are those which are usual in cell culture, and reflect the animal origin of the cells.

The pH of the culture medium is controlled within the range from about 6.8 to about 7.2. The pH of the culture medium, as previously discussed, is controlled by adjusting the gas exchange of the culture system, or by adding acids or bases to the medium. Very often, the cells themselves will control the pH at a desirable level within the named range. It is necessary, however, particularly when a new culture is being initiated, to keep a careful watch on the pH of the medium in order to avoid rapid pH swings resulting from abrupt changes in the metabolism of the cells.

Considerable manipulation of the culture medium and of the culture itself is necessary to keep the cells multiplying steadily. It is necessary periodically to renew the supply of nutrients by removing some or all of the old medium and replacing it with fresh medium. Since the cells multiply, it is also necessary periodically to remove part of the cells to keep the cell population at a level which allows continued multiplication of the cells.

Further, it is usually found that in the early stages of adaptation and production, the cells tend to form suspended aggregates of cells. The aggregated cells in general are of reduced viability, and at any rate are not being adapted to suspension culture. Therefore, it is necessary to redisperse them.

Thus, the manipulations to be performed on a suspension culture are the removal and replacement of spent medium, the removal of excess cells, and the dispersion of aggregated cells. The performance of the manipulations is interrelated and at times can be performed in one operation.

We have found that it is usually most efficient to withdraw a sample of the culture daily and count the cell population. It may be found that the population has increased above the optimum level, and that no serious clumping of cells is taking place. In such a case, the operator should calculate the quantity of cells which should be removed to reduce the cell population to the optimum level. He should withdraw the amount of culture which contains that number of cells, and add an equal volume of fresh medium. Of course, the fresh medium should preferably be added at the approximate temperature of the culture.

On the other hand, it may be found that the cell population has not substantially increased, but that there is reason to believe that the medium has become depleted of nutrients. It is then necessary to withdraw old medium and replace it without removing part of the cell population. It is convenient to stop the agitation for a time, allow the cells to settle to the bottom of the culture vessel, and withdraw part of the supernatant culture medium from above the cells.

The advantage of conducting our process in a resinous, organic, polymeric vessel is seen particularly clearly when the cells are allowed to settle out of suspension so that clear medium may be withdrawn. It is not possible to allow the cells to settle out in a nonpolymeric vessel; the cells would immediately adhere to the bottom of the vessel. In our polymeric vessels, the cells settle to the bottom, lie there while the medium is removed, and immediately return to suspension when agitation is begun again. There is a possibility of the cells forming aggregates while settling out, however. If the culture vessel is equipped with a filter for the removal of clear medium, it is easy to remove part of the medium without the necessity to stop the agitation.

More complicated manipulation of the culture is necessary when appreciable quantities of the cells have aggregated. At such times, it is necessary to disperse the aggregated cells by enzymatic or chemical means, since vigorous agitation cannot be applied to the culture without physical injury to the cells. It is well known that aggregates of cells can be dispersed by treatment with trypsin or with chelating agents such as salts of EDTA or of nitrilotriacetic acid. It is usually necessary to make a complete change of medium when aggregated cells are dispersed.

One convenient way to disperse aggregated cells is to add a sufficient amount of trypsin or of a chelating agent to the culture to provide an effective cell-dispersing concentration in the medium. For example, a sufficient amount of trypsin to provide a 0.01 to 0.10 percent solution in the medium, or enough EDTA to provide a 0.005 to 0.10 percent solution, can be added. Both trypsin and a chelating agent may be used together, as was done in the adaptation reported in Example 3 below.

Alternatively, the cells may be allowed to settle out of suspension, most or all of the supernatant medium may be removed from the vessel, and the dispersing agent added to the residual medium and cells. Naturally, less dispersing agent is needed to disperse aggregates in this way than if an equivalent concentration of dispersing agent is established in the culture as a whole.

Agitation of the culture medium is continued for a short time, such as 10 to 60 minutes, after addition of the cell-dispersing agent. Agitation is then stopped, and the cells are allowed to settle out of the suspension. The supernatant medium is then removed from the culture vessel, and the cells may be washed a few times with portions of fresh medium to remove residual cell-dispersing agent. The culture vessel is refilled with fresh medium, the agitator is started to lift the settled cells back into suspension, and the process proceeds.

Some shock to the cells results from the addition of a large amount of fresh medium. Such shock can be avoided by removing small increments of spent medium and adding small increments of fresh medium. If the multiplication rate of the culture is such that it can afford a constant depletion of the cell population, a steady small stream, or frequent small portions, of the mixed culture can be removed, and a steady small stream of fresh medium added to replace it. If the multiplication rate of the culture is not so high that portions of the culture can be steadily removed, old medium may be removed through a filter as described above.

Those skilled in the art will understand that the adaptation process may be combined with the scaling-up of the culture to the desired size. The adaptation culture may be started in a culture vessel filled to the minimum extent which allows good mixing. As the cells become adapted, and replication goes on, fresh medium can be added to the vessel to keep the cell population approximately constant. When the vessel is full and it becomes necessary to withdraw cells, the cells can be transferred to another culture vessel and used to initiate a second culture. By successively transferring excess cells from an existing culture to new cultures, any desired cell mass can be built up. Thus, the culture can be scaled up, and cell production started, at the same time the cells are being adapted to suspension culture.

The examples below show the adaptation and production of three typical cells according to our new method. We do not mean to imply that cells of the types described below are the only ones which may be produced by our method. We believe the method to be applicable to all types of animal cells. The examples below serve, however, to illustrate in detail the ways in which our method may be carried out, and to illustrate the outstanding effectiveness of the method.

Example 1

LLC-MK$_2$ Cells

A culture of the well-known monkey kidney cell line, LLC-MK$_2$, ATCC identification numbers 7 and 7.1, was adapted and produced in suspension culture by our method.

The cells to be adapted were at the 280th passage level, and had for the past 60 semi-weekly passages been growing in bottle culture in Medium 199 supplemented with 3 percent newborn calf serum.

The culture vessel was a modified one-liter polypropylene Erlenmeyer flask. A motor-powered polytetrafluoroethylene stirrer blade agitated the culture. A tube inserted through the wall of the flask and sealed in place, reaching into the culture, was used both to withdraw portions of the culture and to add fresh medium. An air breather packed with sterile cotton was similarly inserted through the wall of the flask into the headspace. No gas other than air was supplied to the culture.

The temperature of the culture was controlled by storing the flask in a water bath at 35–36°C. When fresh medium was added, it was added very slowly to avoid thermal shock.

The medium used was of the formula described above. Concentrations of all the medium ingredients were the preferred concentrations, and phenol red was added as a pH indicator. The serum component of the medium was newborn calf serum.

The suspension culture was started at a population of 200,000 cells per ml. The cells were removed from their bottle cultures by pouring the medium off the cell sheets, trypsinizing the cells with 0.1 percent trypsin solution to loosen the cells from the bottle and to break up the cell sheet, and centrifuging the cell suspension to separate the cells from the trypsin. The cells were then suspended in suspension culture medium and counted.

A quantity of the cell suspension calculated to contain about $10^8$ cells was added to 500 ml. of medium in the culture vessel, the vessel was placed in the water bath, and the stirrer was started at a speed which provided thorough agitation of the suspension without causing the medium to foam. The air breather was kept closed for a few days after the culture was started. It was found that no addition of acid or base to control the pH of the culture was needed; the pH remained in the range of 6.9 to 7.2.

The cell population was counted daily. A base line population of 150,000 cells per ml. was used during the process. If the count was substantially above the base line, a portion of the mixed culture was removed, and fresh medium was added in such a quantity as to return the population to the base line density. On a few occasions, no or slight multiplication of the cells occurred in a day's time. On those occasions, the agitator was stopped and the cells were allowed to settle for about 6–18 hours. All the supernatant medium was then withdrawn, and a fresh supply of medium added. Then the agitator was started up again to resuspend the settled cells and continue the process.

The cells were allowed to settle and complete medium changes were made on days 13, 15, and 21. On all other days, fresh medium was added only as needed to dilute the culture to base line population.

The progress of the adaptation and production process is reported in the table below. Five facts are reported for each day. The first two data columns show the culture volume and the cell population observed after each day's growth. The third and fourth data columns report the culture volume and cell population after a portion of the culture was removed and fresh medium added to return the population to approximately the base line density. The fifth data column reports each day's multiplication factor, the ratio of the cell population after each day's multiplication to the population after dilution on the day before.

| Day | Found Ml. | Cells/ml. × $10^5$ | Diluted Ml. | Cells/ml. × $10^5$ | Multiplication Factor |
|---|---|---|---|---|---|
| 1 | Initiated | | 500 | 2.00 | |
| 2 | 500 | 2.25 | 500 | 1.41 | 1.50 |
| 3 | 500 | 2.00 | 510 | 1.50 | 1.42 |
| 4 | 510 | 2.25 | 520 | 1.50 | 1.50 |
| 5 | 520 | 2.00 | 530 | 1.50 | 1.33 |
| 6 | 530 | 2.50 | 540 | 1.50 | 1.67 |
| 7 | 540 | 2.00 | 550 | 1.50 | 1.33 |
| 8 | 550 | 2.00 | 660 | 1.50 | 1.33 |
| 9 | 660 | 2.00 | 570 | 1.50 | 1.33 |
| 10 | 570 | 2.00 | 580 | 1.50 | 1.33 |
| 11 | 580 | 2.00 | 580 | 1.50 | 1.33 |
| 12 | 580 | 2.00 | 680 | 1.50 | 1.33 |
| 13 | 680 | 1.50 | 680 | 1.50 | 1.00 |
| 14 | 680 | 2.50 | 580 | 1.50 | 1.67 |
| 15 | 580 | 1.75 | 580 | 1.75 | 1.17 |
| 16 | 580 | 2.00 | 590 | 1.50 | 1.14 |
| 17 | 590 | 2.00 | 600 | 1.50 | 1.33 |
| 18 | 600 | 2.50 | 610 | 1.50 | 1.67 |
| 19 | 610 | 2.00 | 620 | 1.50 | 1.33 |
| 20 | 620 | 2.00 | 820 | 1.50 | 1.33 |
| 21 | 820 | 1.75 | 820 | 1.75 | 1.17 |
| 22 | 820 | 2.25 | 550 | 1.50 | 1.28 |
| 23 | 550 | 2.00 | 560 | 1.50 | 1.33 |
| 24 | 560 | 2.25 | 570 | 1.50 | 1.50 |
| 25 | 570 | 2.25 | 580 | 1.50 | 1.50 |
| 26 | 580 | 2.00 | 765 | 1.50 | 1.33 |
| 27 | 765 | 2.00 | 715 | 1.50 | 1.33 |
| 28 | 715 | 2.25 | 750 | 1.50 | 1.50 |
| 29 | 750 | 2.00 | 760 | 1.50 | 1.33 |
| 30 | 760 | 2.00 | 770 | 1.50 | 1.33 |
| 31 | 770 | 2.00 | 780 | 1.50 | 1.33 |
| 32 | 780 | 2.25 | 630 | 1.50 | 1.50 |
| 33 | 630 | 2.00 | 640 | 1.50 | 1.33 |
| 34 | 640 | 2.00 | 600 | 1.50 | 1.33 |
| 35 | 600 | 2.25 | 600 | 1.50 | 1.50 |
| 36 | 600 | 2.25 | 300 | 1.50 | 1.50 |
| 37 | 300 | 2.00 | 395 | 1.50 | 1.33 |
| 38 | 395 | 2.25 | 580 | 1.50 | 1.50 |
| 39 | 580 | 2.25 | 300 | 1.50 | 1.50 |
| 40 | 300 | 2.75 | 310 | 1.50 | 1.83 |
| 41 | 310 | 2.25 | 460 | 1.50 | 1.50 |
| 42 | 460 | 2.75 | 460 | 1.50 | 1.83 |
| 43 | 460 | 2.25 | 300 | 1.50 | 1.50 |
| 44 | 300 | 2.50 | 395 | 1.87 | 1.67 |
| 45 | 359 | 3.00 | 790 | 1.48 | 1.60 |
| 46 | 790 | 2.50 | 860 | 1.50 | 1.69 |
| 47 | 860 | 2.25 | 855 | 1.50 | 1.50 |
| 48 | 855 | 2.00 | 880 | 1.50 | 1.33 |
| 49 | 880 | 2.25 | 300 | 1.50 | 1.50 |
| 50 | 300 | 2.50 | 500 | 1.50 | 1.67 |
| 51 | 500 | 2.50 | 510 | 1.50 | 1.67 |
| 52 | 510 | 2.50 | 520 | 1.50 | 1.67 |
| 53 | 520 | 2.50 | 530 | 1.50 | 1.67 |
| 54 | 530 | 2.50 | 875 | 1.50 | 1.67 |
| 55 | 875 | 2.25 | 640 | 1.50 | 1.50 |
| 56 | 640 | 2.50 | 625 | 1.50 | 1.67 |
| 57 | 625 | 2.50 | 370 | 1.22 | 1.67 |
| 58 | 370 | 2.50 | 650 | 1.40 | 2.04 |
| 59 | 650 | 2.25 | 800 | 1.50 | 1.60 |
| 60 | 800 | 2.25 | 500 | 1.50 | 1.50 |

It is clear from an examination of the data above that LLC-MK$_2$ cells began to multiply vigorously in suspension culture almost at once. The last day on which the culture failed to increase its population by at least a factor of 1.33 in a day's time was day 22. Even before that day, the culture had shown no multiplication at all on only one day, and on only three other days had it failed to multiply by a factor of 1.33 per day.

After the cells had been in suspension culture for only one month, the culture multiplied its population by a factor of 1.5 on most days. During the second month reported, the average factor was about 1.6 per day, and on only 5 days was the multiplication factor less than 1.5. A daily multiplication factor of 1.6 is equivalent to a ten-fold increase of cells in less than 5 days. Clearly, the culture very rapidly produced cells capable of use for production of virus vaccines.

The culture was used to produce cells which were extensively tested. The culture was used to inoculate successively larger suspension culture vessels until a 14-liter culture was established, which was allowed to produce cells steadily for 40 weeks. The cells in that culture were concentrated to $20 \times 10^6$ cells per ml., and a number of ampoules of the concentrated cells were frozen and stored in liquid nitrogen. After a period of storage, the frozen cells, which constituted a master cell stock of suspension-culture-adapted LLC-MK$_2$ cells, were thawed and a number of tests were applied to assure that the cells could be used as biological production hosts.

Cells propagated for 2 and 4 weeks from the master cell stock were found to have modal chromosome numbers of 61 and 62 respectively. The modal chromosome numbers for the LLC-MK$_2$ cells, ATCC CCL 7 and CCL 7.1, are 65 and 70 respectively. No marker chromosomes were noted.

Cells propagated from the master cell stock were negative for cytopathology after 15 days in culture in 25-square-centimeter Falcon flasks. Cells propagated from the master cell stock were negative for hemadsorption.

Monolayer cultures of cells propagated from the master cell stock and stained with acridine orange after 15 days' incubation showed no evidence of inclusion bodies, abnormal numbers of giant cells, or cytopathology due to adventitious agents.

Cells propagated from the master cell stock in suspension for one and for four months were combined in 1 to 1 ratio to give a suspension containing $10^6$ cells per ml. Fifty hamsters were anesthetized, 5 mg. of cortisone acetate was injected, and 0.1 ml. of the cell suspension was inoculated into each cheek pouch of each hamster. Cortisone acetate was administered again at 6 and at 12 days after the first dose. The hamsters were examined at 6, 12, 19, 20 and 26 days after inoculation, and the surviving hamsters were sacrificed and necropsied after 62 days. No evidence of proliferating, progressive tumors in the cheek pouches was noted at any time during the test.

A similar test was performed with a cell suspension which comprised $10^7$ cells per ml., composed of equal numbers of cells thawed from the master cell stock and propagated in suspension for 4 months, and cells thawed from ampoules of the cell stock. The cells were disrupted by three freeze-thaw cycles in a Dry Ice-alcohol bath before injection in the cheek pouches of 50 hamsters. No evidence of growth of cells, malignancy, or other abnormalities was observed during the test or at necropsy at the end of the test.

On the other hand, 26 of 48 control hamsters which were inoculated with KB cells at $10^6$ cells per ml. developed progressive tumors.

Suspension cultures of LLC-MK$_2$ cells produced by our method were inoculated with parainfluenza, measles, and canine distemper viruses. All three viruses grew successfully in the suspension cultured cells to titers equal to or greater than the titers routinely obtained in bottle cultures of the same cell line.

The tests performed on LLC-MK$_2$ cells produced in suspension culture by our method show that the suspension-adapted cells multiply rapidly and efficiently. Further, the cells have not been altered in any essential characteristic by the adaptation, are not tumorigenic nor oncogenic, and are capable of serving as hosts for the economical production of virus vaccines.

EXAMPLE 2

PK$_{15}$ Cells

We adapted and produced the well-known PK$_{15}$ pig kidney cell line, ATCC CCL 33, in suspension culture by our new method. The process used was in most respects identical to the process of Example 1.

The bottle-cultured PK$_{15}$ cells were inoculated into 100 ml. of medium in a 125 ml. polycarbonate flask, at a cell population of 230,000 cells per ml. The culture was kept at 37–38°C.

During the early stages of the adaptation process, cells multiplied erratically and had some tendency to adhere in clumps even to polymeric surfaces, as well as to develop some suspended aggregates. Such clumps of cells were dispersed by adding a solution of 0.05 percent trypsin and 0.02 percent EDTA sodium salt in saline to the settled cells at the time a medium change was performed. Cells were stirred in the dispersing solution for 10–20 minutes before the culture was rediluted with fresh medium.

The medium and pH of the process were the same as described in Example 1. Each day, a portion of the culture was withdrawn and fresh medium added to dilute the culture to its base line population of about $2.0 \times 10^5$ cells per ml. The table below reports the cell population which was observed on each day of the process before dilution, and the multiplication factor observed.

| Day | Cell Population $\times 10^5$ | Multiplication Factor |
|---|---|---|
| 0 | Culture Initiated | |
| 1 | 3.10 | 1.55 |
| 2 | 2.30 | 1.15 |
| 3 | 5.00 | 2.50 |
| 4 | 4.25 | 2.12 |
| 5 | 3.25 | 1.62 |
| 6 | 2.25 | 1.12 |
| 7 | 2.25 | 1.12 |
| 8 | 3.00 | 1.50 |
| 9 | 3.50 | 1.75 |
| 10 | 2.75 | 1.38 |
| 11 | 4.00 | 2.00 |
| 12 | 3.50 | 1.75 |
| 13 | 3.50 | 1.75 |
| 14 | 3.50 | 1.75 |
| 15 | 3.00 | 1.50 |
| 16 | 2.75 | 1.38 |
| 17 | 2.50 | 1.25 |
| 18 | 3.50 | 1.75 |
| 19 | 2.75 | 1.38 |
| 20 | 2.75 | 1.38 |
| 21 | 2.75 | 1.38 |
| 22 | 3.00 | 1.50 |

-Continued

| Day | Cell Population × $10^5$ | Multiplication Factor |
|---|---|---|
| 23 | 2.75 | 1.38 |
| 24 | 4.50 | 2.25 |
| 25 | 2.75 | 1.38 |
| 26 | 2.25 | 1.12 |
| 27 | 3.25 | 1.62 |
| 28 | 4.50 | 2.25 |
| 29 | 2.25 | 1.12 |
| 30 | 5.25 | 2.62 |
| 31 | 2.00 | 1.00 |
| 32 | 3.25 | 1.62 |
| 33 | 2.75 | 1.38 |
| 34 | 4.25 | 2.12 |
| 35 | 5.25 | 2.62 |
| 36 | 3.25 | 1.62 |
| 37 | 3.75 | 1.88 |
| 38 | 2.75 | 1.38 |
| 39 | 2.50 | 1.25 |
| 40 | 4.25 | 2.12 |
| 41 | 3.50 | 1.75 |
| 42 | 3.25 | 1.62 |
| 43 | 2.50 | 1.25 |
| 44 | 2.50 | 1.25 |
| 45 | 6.00 | 3.00 |
| 46 | 3.75 | 1.88 |
| 47 | 4.00 | 2.00 |

The multiplication of $PK_{15}$ cells was quite erratic from day to day, and the regular production of $MK_2$ cells was never matched by $PK_{15}$ cells. Nevertheless, inspection of the data above reveals that the average and the peak multiplication factors obtained increased steadily to a very rapid final multiplication as the process continued. During the last two weeks reported, the log multiplication factor was about 1.75, a very substantial sustained multiplication of the cells which produces a 20-fold increase of cell numbers in about 5 days.

Example 3

LLC-$PK_1$ Cells

The proprietary pig kidney cell line, LLC-$PK_1$, was also adapted to suspension culture by our method. The medium and culture conditions in general were the same as those used for $PK_{15}$. In order to establish good multiplication in suspension culture, it was found helpful to first adapt the monolayer-cultured LLC-$PK_1$ cells to Eagle's minimum essential medium supplemented with newborn calf serum and Eagle's nonessential amino acids. The $PK_1$ cells, so adapted, multiplied at increased rates and established a greater cell population in bottle cultures. The monolayer cultures of cells were harvested from bottles with a trypsin-EDTA solution containing 0.4 percent of methyl cellulose. The increased viscosity of the harvesting dispersing solution minimized cell damage.

The LLC-$PK_1$ cells tended to form clumps, which were disaggregated with trypsin-EDTA at medium changes, as the $PK_{15}$ cells were. It was found necessary to maintain cell population at 300,000 cells per ml. or more to obtain multiplication of LLC-$PK_1$ cells.

The cell population was counted daily, and from time to time part of the suspension was removed and replaced with fresh medium to dilute the culture to base line population. In the early stages of the adaptation, much of the cell mass consisted of nonviable cells. As the adaptation progressed, it was found that a steadily higher proportion of the cell mass comprised viable cells, rather than vacuolated and non-viable cells.

The table below reports 99 days of the adaptation and production of LLC-$PK_1$ cells. The first data column indicates the days on which medium was changed and clumps of cells were dispersed with trypsin-EDTA. The second data column shows the total number of cells in the culture, as counted. The next data column shows the number of cells to which the culture was reduced when part of the culture was removed. The last column shows the daily multiplication factor for the periods between successive removals of cells from the culture. Where more than one day elapsed between withdrawals of cells, the multiplication factor given is the log multiplication factor.

| Day | Medium Change | Number of Cells × $10^7$ Found | Reduced | Multiplication Factor/Day |
|---|---|---|---|---|
| 0 | | culture initiated | | |
| 1 | | 5 | | |
| 2 | | 7 | | |
| 3 | x | 12 | | |
| 6 | | 22 | 11 | 1.35 |
| 7 | | 11 | | |
| 8 | | 5.5 | | |
| 9 | | 6.5 | | |
| 13 | x | 17 | | |
| 15 | x | 10 | | |
| 17 | x | 5 | | |
| 20 | | 7 | | |
| 22 | x | 13 | | |
| 24 | x | 13 | | |
| 27 | x | 11 | | |
| 29 | x | 11 | | |
| 31 | x | 9 | | |
| 34 | | 19.5 | | |
| 35 | x | 17.5 | | |
| 36 | | 9 | | |
| 37 | x | 12.5 | | |
| 40 | x | 19.5 | | |
| 41 | | 17.5 | | |
| 42 | | 22 | | |
| 43 | | 26 | 22 | 1.009 |
| 44 | x | 24 | | |
| 47 | x | 27.5 | | |
| 48 | | 20 | | |
| 49 | | 26.5 | 17 | 1.031 |
| 50 | x | 20 | | |
| 51 | | 13 | | |
| 54 | x | 24 | | |
| 55 | | 16.5 | | |
| 56 | | 15 | | |
| 57 | | 19 | | 1.014 |
| 58 | x | 19 | | |
| 60 | | 24 | | |
| 61 | x | 23.5 | 20 | 1.14 |
| 62 | | 16 | | |
| 63 | | 18 | | |
| 65 | | 27 | | |
| 66 | x | 32 | 16 | 1.10 |
| 67 | | 14 | | |
| 68 | | 20 | | |
| 69 | | 24.5 | | |
| 70 | | 31 | 13 | 1.18 |
| 71 | x | 12 | | |
| 73 | | 19 | 12 | 1.13 |
| 74 | | 24 | 12 | 2.00 |
| 75 | | 20 | 12 | 1.67 |
| 76 | x | 19 | | |
| 77 | | 20 | | |
| 78 | | 36 | 22 | 1.44 |
| 79 | | 30 | 21 | 1.37 |
| 80 | | 23 | 12 | 1.05 |
| 81 | x | 12 | | |
| 82 | | 12 | | |
| 83 | | 12 | | |
| 84 | | 21.5 | 12 | 1.16 |
| 85 | | 15 | | |
| 86 | | 24.5 | 10 | 1.43 |
| 87 | x | 17.5 | | |
| 88 | | 12 | | |
| 89 | | 16 | | |
| 90 | | 31.5 | 18.5 | 1.33 |
| 91 | | 26.5 | 12 | 1.43 |
| 92 | | 15 | | |

-Continued

Number of Cells × 10⁷

| Day | Medium Change | Found | Reduced | Multiplication Factor/Day |
|---|---|---|---|---|
| 93 |   | 19 |   |   |
| 94 | x | 22 | 16.5 | 1.22 |
| 95 |   | 15 | 13 | −1.10 |
| 96 |   | 20 | 12 | 1.54 |
| 97 |   | 20.5 | 12 | 1.71 |
| 98 |   | 20.5 |   |   |
| 99 |   | 28 |   | 1.53 |

The table above shows dramatically how great an improvement in the multiplication of LLC-PK$_1$ cells was made by adaptation to our method. During the first 6 weeks of the process, 13 medium changes were necessary, despite which the cell population increased at the very low multiplication factor of 1.039 per day. A rate of production as steady as that of LLC-MK$_2$ cells was never attained by LLC-PK$_1$ cells, but reasonably consistent production was attained by the third month of the process. Only five medium changes were necessary during the final month of the process, during which the log multiplication factor was over 1.3 per day. The factor is equivalent to a 50-fold increase every 15 days.

We claim:

1. A method of producing animal cells in suspension culture which comprises:

A. adding a population of at least about $10^5$ of the cells per ml. to a suspension culture medium comprising:

| Ingredient | Concentration Range (mg./l.) |
|---|---|
| NaCl | 2410–2950 |
| KCl | 140–170 |
| NaH$_2$PO$_4$.H$_2$O | 500–600 |
| MgSO$_4$.7H$_2$O | 70–85 |
| NaHCO$_3$ | 360–450 |
| glucose | 3150–3850 |
| l-arginine | 151–185 |
| l-cystine | 34–42 |
| l-histidine | 44–54 |
| l-valine | 66–80 |
| l-isoleucine | 76–92 |
| l-leucine | 76–92 |
| l-lysine | 83–101 |
| l-methionine | 21.5–26.5 |
| l-phenylalanine | 46–56 |
| l-threonine | 68–84 |
| l-tryptophan | 14.5–17.5 |
| l-tyrosine | 51–63 |
| l-glutamine | 525–640 |
| l-alanine | 12.5–15.5 |
| l-asparagine.H$_2$O | 21.5–26.5 |
| l-aspartic acid | 19–23 |
| l-glutamic acid | 20.5–25.5 |
| l-proline | 16–20 |
| l-serine | 15–18 |
| glycine | 11–13 |
| choline chloride | 1.4–1.8 |
| folic acid | 1.4–1.8 |
| i-inositol | 2.9–3.5 |
| nicotinamide | 1.4–1.8 |
| d-calcium pantothenate | 1.4–1.8 |
| pyridoxal hydrochloride | 1.4–1.8 |
| riboflavin | 0.14–0.18 |
| thiamine hydrochloride | 1.4–1.8 |
| methyl cellulose, 15 cps | 110–130 |
| tryptose phosphate broth powder | 1150–1400 |
| blood serum | 10–200 ml./l. | distilled pyrogen-free water q.s. to 1000 ml.;

B. said medium being contained in a culture vessel substantially all the medium-contacting surfaces of which are resinous, organic, polymeric surfaces;

C. culturing the cells, said culturing comprising the steps of:

1. agitating the medium sufficiently to keep the cells in suspension, but not so vigorously as to cause foaming of the medium or denaturation of components of the medium;
   2. maintaining the temperature of the medium at about 32°C. to about 41°C.;
   3. maintaining the pH of the medium at about 6.8 to about 7.2;
   4. periodically removing part of the medium;
   5. periodically replacing the medium removed with fresh medium;
   6. periodically dispersing aggregates of cells; and
   7. periodically removing a quantity of cells sufficient to maintain the cell population at about $10^5$ to about $10^6$ cells per milliliter.

2. A method of claim 1 wherein the polymeric surfaces comprise polycarbonate, polypropylene, or polytetrafluoroethylene polymers.

3. A method of claim 2 wherein the temperature is from about 35°C. to about 38°C.

4. A method of claim 3 wherein the blood serum is bovine.

5. A method of claim 1 wherein the concentration range of the blood serum in the suspension culture medium is 50–150 ml./l.

6. A method of claim 5 wherein the polymeric surfaces comprise polycarbonate, polypropylene, or polytetrafluoroethylene polymers.

7. A method of claim 6 wherein the temperature is from about 35°C. to about 38°C.

8. A method of claim 7 wherein the blood serum is bovine.

9. A method of claim 5 wherein the suspension culture medium comprises:

| Ingredient | Concentration | |
|---|---|---|
| NaCl | 2680 | mg./l. |
| KCl | 155 | |
| NaH$_2$PO$_4$.H$_2$O | 550 | |
| MgSO$_4$.7H$_2$O | 78 | |
| NaHCO$_3$ | 410 | |
| glucose | 3500 | |
| l-arginine | 168 | |
| l-cystine | 38 | |
| l-histidine | 49 | |
| l-valine | 73 | |
| l-isoleucine | 84 | |
| l-leucine | 84 | |
| l-lysine | 92 | |
| l-methionine | 24 | |
| l-phenylalanine | 51 | |
| l-threonine | 76 | |
| l-tryptophan | 16 | |
| l-tyrosine | 57 | |
| l-glutamine | 584 | |
| l-alanine | 14 | |
| l-asparagine.H$_2$O | 24 | |
| l-aspartic acid | 21 | |
| l-glutamic acid | 23 | |
| l-proline | 18 | |
| l-serine | 16.5 | |
| glycine | 12 | |
| choline chloride | 1.6 | |
| folic acid | 1.6 | |
| i-inositol | 3.2 | |
| nicotinamide | 1.6 | |
| d-calcium pantothenate | 1.6 | |
| pyridoxal hydrochloride | 1.6 | |
| riboflavin | 0.16 | |

-Continued

| Ingredient | Concentration |
|---|---|
| thiamine hydrochloride | 1.6 |
| methyl cellulose, 15 cps | 120 |
| tryptose phosphate broth powder | 1290 |
| blood serum | 80 ml./l. |
| distilled pyrogen-free water q.s. to 1000 ml. | |

10. A method of claim 9 wherein the polymeric surfaces comprise polycarbonate, polypropylene, or polytetrafluoroethylene polymers.

11. A method of claim 10 wherein the temperature is from about 35°C. to about 38°C.

12. A method of claim 11 wherein the blood serum is bovine.

* * * * *